US012000518B2

(12) United States Patent
Ramos (10) Patent No.: US 12,000,518 B2
(45) Date of Patent: Jun. 4, 2024

(54) SEALING DEVICE FOR REFRIGERATOR AND REFRIGERATOR COMPRISING THE SAME

(71) Applicant: ELECTROLUX DO BRASIL S.A., Curitiba (BR)

(72) Inventor: Francisco Martins Neto Ramos, Curitiba (BR)

(73) Assignee: Electrolux do Brasil S. A., Curitiba (BR)

( * ) Notice: Subject to any disclaimer, the term of this patent is extended or adjusted under 35 U.S.C. 154(b) by 345 days.

(21) Appl. No.: 17/433,644

(22) PCT Filed: Mar. 9, 2020

(86) PCT No.: PCT/BR2020/050072
§ 371 (c)(1),
(2) Date: Aug. 25, 2021

(87) PCT Pub. No.: WO2020/186321
PCT Pub. Date: Sep. 24, 2020

(65) Prior Publication Data
US 2022/0146020 A1    May 12, 2022

(30) Foreign Application Priority Data
Mar. 15, 2019   (BR) ...................... 10 2019 005148 5

(51) Int. Cl.
*F16L 5/10*   (2006.01)
*F25D 23/06*  (2006.01)
(52) U.S. Cl.
CPC .............. *F16L 5/10* (2013.01); *F25D 23/061* (2013.01); *F25D 2400/40* (2013.01)
(58) Field of Classification Search
CPC ..... F16L 5/10; F16L 5/14; F16L 5/027; F25D 23/061; F25D 2400/40; F25D 23/065;
(Continued)

(56) References Cited

U.S. PATENT DOCUMENTS 2,573,600 A * 10/1951 Pruehs ................. H02G 3/0633
  16/2.5
4,180,297 A * 12/1979 Abrams ................ F25D 23/065
  16/2.2
(Continued)

FOREIGN PATENT DOCUMENTS

CN   101606030   12/2009
CN   102395849   3/2012
(Continued)

OTHER PUBLICATIONS

Chinese Office action (English translation) for application No. 202080018014.x dated Jan. 10, 2023, 8 pages.
(Continued)

*Primary Examiner* — Hiwot E Tefera
(74) *Attorney, Agent, or Firm* — Pearne & Gordon LLP (57) ABSTRACT

The refrigerator (1000) includes a first surface (1); a second surface (2); an insulating element (3) arranged between the first and second surfaces (1, 2); and a sealing device (100). The sealing device (100) is associated with at least one of the first and second surfaces (1, 2) and includes: an external structure (10), an internal structure (20) and a connection region (30) that interconnects the external structure (10) with the internal structure (20); at least one first fixing element (31) arranged in the connection region (30); a through-hole (40) between the external (10) and internal (20) structures; wherein the at least one first fixing element (31) forms a male-female arrangement with at least one of the first and second surfaces (1, 2).

13 Claims, 9 Drawing Sheets

(58) Field of Classification Search
CPC ..... F25D 23/064; B60R 16/0222; H02G 3/22; H02G 15/013
USPC ....... 277/606; 174/153 G, 152 G; 16/2.1, 2.2
See application file for complete search history.

(56) References Cited

U.S. PATENT DOCUMENTS

| | | | | |
|---|---|---|---|---|
| 5,238,299 | A * | 8/1993 | McKinney | F25D 23/065 312/406 |
| 6,051,790 | A * | 4/2000 | Takeuchi | B60R 16/0207 174/72 A |
| 6,312,046 | B1 * | 11/2001 | Sora | B60R 16/0222 174/152 G |
| 6,479,748 | B2 * | 11/2002 | Mori | B60R 16/0222 174/152 G |
| 7,244,894 | B1 * | 7/2007 | Lipp | B60R 16/0222 174/152 G |
| 7,615,713 | B2 * | 11/2009 | Bardella | B60R 16/0215 174/152 G |
| 2005/0115019 | A1 * | 6/2005 | Sanroma | H02G 15/013 16/2.1 |
| 2013/0061424 | A1 * | 3/2013 | Lee | E02F 9/163 16/2.2 |
| 2013/0068502 | A1 * | 3/2013 | Law | B60R 16/0222 174/152 G |
| 2017/0176092 | A1 | 6/2017 | Naik | |
| 2021/0174992 | A1 * | 6/2021 | Nomoto | H01B 17/583 |

FOREIGN PATENT DOCUMENTS

| | | |
|---|---|---|
| CN | 102472561 | 5/2012 |
| CN | 103629886 | 3/2014 |
| CN | 106068431 | 11/2016 |
| CN | 207515318 | 6/2018 |
| DE | 102009032479 | 1/2011 |
| EP | 1052741 | 11/2000 |

OTHER PUBLICATIONS

International Search Report for PCT/BR2020/050072 dated May 25, 2020, 2 pages.

* cited by examiner

SEALING DEVICE FOR REFRIGERATOR AND REFRIGERATOR COMPRISING THE SAME

FIELD OF THE INVENTION

The present invention refers, in general, to a refrigerator comprising a first surface, a second surface and a sealing device associated with one of the first and second surfaces, wherein an insulating element is disposed between the first and second surfaces.

BACKGROUND OF THE INVENTION

Refrigerators are household appliances widely used for cooling and preserving the most varied types of food and drinks, both industrially and domestically.

In general terms, a refrigerator is composed of a main body (or refrigerator cabinet) with at least one inner box that defines a cooling compartment.

Commonly, during the manufacture of the refrigerator, the space defined between the main body and the inner box is filled with a thermal insulating material or element.

In addition to thermally insulating the household appliance, the insulating material assists in fixing the structural components of the refrigerator, such as main body panels.

An example of thermal insulating material widely used by the state of the art comprises polyurethane (PU) foam.

A constant concern of refrigerator manufacturers is to ensure that the insulating material is confined only between the main body and the inner box, without entering areas reserved for electronic components of the refrigerator.

Any leakage of the insulating material, which can occur particularly during the step of application of PU foam, can cause damage to electronic components and, consequently, shorten the useful life of such components or even cause risks of electric shock to users.

An example of an electronic component that must be sealed with respect to the insulating material is the electronic board of the refrigerator, which can be configured to control various functions of the refrigerator, such as temperature control of the refrigeration compartment, open door alarm, locking a user interface, ice making, among others.

A solution of the state of the art involves manually sealing structural and/or electronic components of the refrigerator with adhesive tapes prior to the application of PU foam. However, such an operation is costly for the manufacturer and susceptible to errors.

The prior art document U.S. Pat. No. 5,248,196 discloses a refrigerator comprising an outer shell, an inner liner and a insulation space defined between the outer shell and the inner liner.

As noticed in FIG. 2 of the aforementioned document, a wiring harness is provided in the insulation space between the outer shell and the inner liner, with a pair of connectors sealing openings arranged in the outer shell and the inner liner to prevent leakage of foamed-in-place insulation material.

It is worth noting that, in the aforementioned document, the connectors are preferably used in conjunction with gaskets; see FIGS. 16 to 19 of U.S. Pat. No. 5,248,196.

Disadvantageously, the gaskets can be misplaced during the manufacture of the refrigerator, implying risks of leakage of the insulation material.

In general, it is noted the complexity of the solution disclosed by document U.S. Pat. No. 5,248,196, which necessarily requires fixation on two surfaces of the refrigerator and specific holes in the outer shell and the inner liner of the household appliance.

It is also observed the little versatility in the use of the connectors disclosed by the American document. An example of this would be the need for intermediate connections if the pair of connectors were connected to an electronic board of the refrigerator.

In conclusion, it is noted that the state-of-the-art lacks solutions that disclose a refrigerator equipped with a versatile and simple geometry sealing device that does not require additional sealing means, such as gaskets.

Also, the state-of-the-art lacks solutions that disclose a refrigerator with a satisfactory seal with respect to the thermal insulating material without using or minimizing the use of adhesive tapes.

DESCRIPTION OF THE INVENTION

It is an objective of the present invention to propose a refrigerator comprising a low cost and simple manufacturing sealing device.

Another objective of the present invention is to propose a refrigerator comprising a sealing device having a simple and practical fitting to at least one refrigerator surface.

It is an objective of the present invention to propose a refrigerator comprising a sealing device suitable for sealing electronic refrigerator components in relation to a thermal insulating material or element.

It is also an objective of the present invention to propose a sealing device that allows assembly through robotic processes.

One or more of the aforementioned objectives of the invention, among others, (is) are achieved by means of a refrigerator comprising a first surface; a second surface; an insulating element disposed between the first and second surfaces; and a sealing device; the sealing device being associated with at least one of the first and second surfaces; wherein the sealing device comprises an external structure, an internal structure and a connection region that interconnects the external structure with the internal structure; at least one first fixing element arranged in the connection region; a through-hole between the external and internal structures; wherein the at least one first fixing element forms a male-female arrangement with at least one of the first and second surfaces.

BRIEF DESCRIPTION OF THE DRAWINGS

The objectives, technical effects and advantages of the refrigerator, object of the invention, will be apparent to those skilled in the art from the detailed description below that makes reference to the attached figures, which illustrate an exemplary, but not limiting, embodiment of the invention.

DESCRIPTION OF EMBODIMENTS OF THE INVENTION

Initially, it should be highlighted that the refrigerator, object of the invention, will be described below according to particular embodiments represented in FIGS. 1 to 12 attached, but not limiting, since its achievement can be carried out in different ways and variations and according to the application desired by a person skilled in the art.

The use of the term "a" or "one" in the present specification does not indicate a limited quantity, but the existence of at least (at the least) one of the elements/components/items listed. The use of the term "or" indicates any or all of the elements/components/items listed. The use of the term "comprising", "endowed with", "provided with" or a similar term indicates that the element/component/item listed in front of said term is part of the invention, but they do not exclude other elements/components/items not listed. The use of the term "associating", "connecting" or similar terms can refer to physical, mechanical, pneumatic, fluidic, hydraulic, electrical, electronic or wireless connections, either directly or indirectly.

In general, the present invention refers to a refrigerator 1000 comprising a sealing device 100.

Regarding its structure, the refrigerator 1000 comprises a first surface 1, a second surface 2, an insulating element 3 arranged between the first 1 and the second 2 surfaces and a sealing device 100.

The thermal insulating element comprises, for example, a layer of polyurethane (PU) foam. The PU foam layer can be foamed locally during the manufacture of the refrigerator 1000 in a space defined between the first 1 and the second 2 surfaces.

Figure 1:
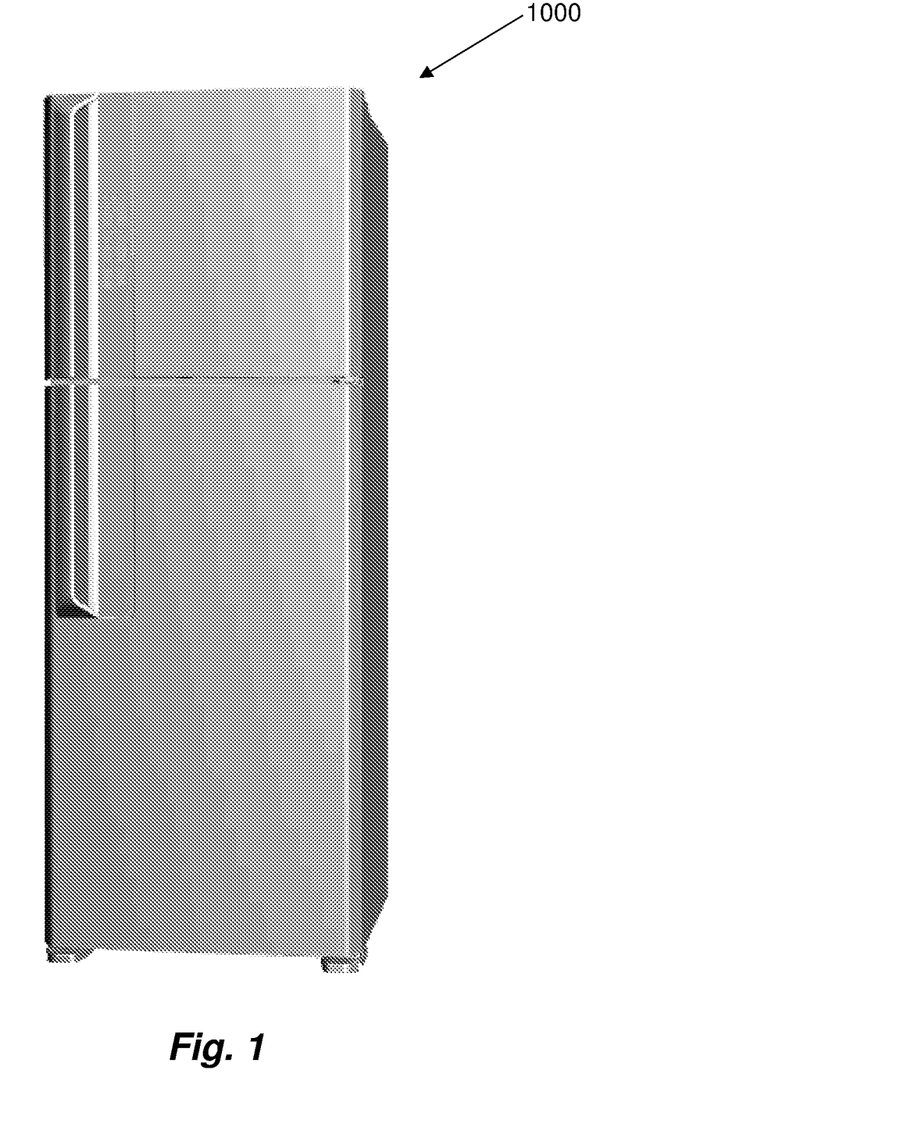
FIG. 1 shows a perspective view of a refrigerator comprising a sealing device, object of the present invention.
Figure 2:
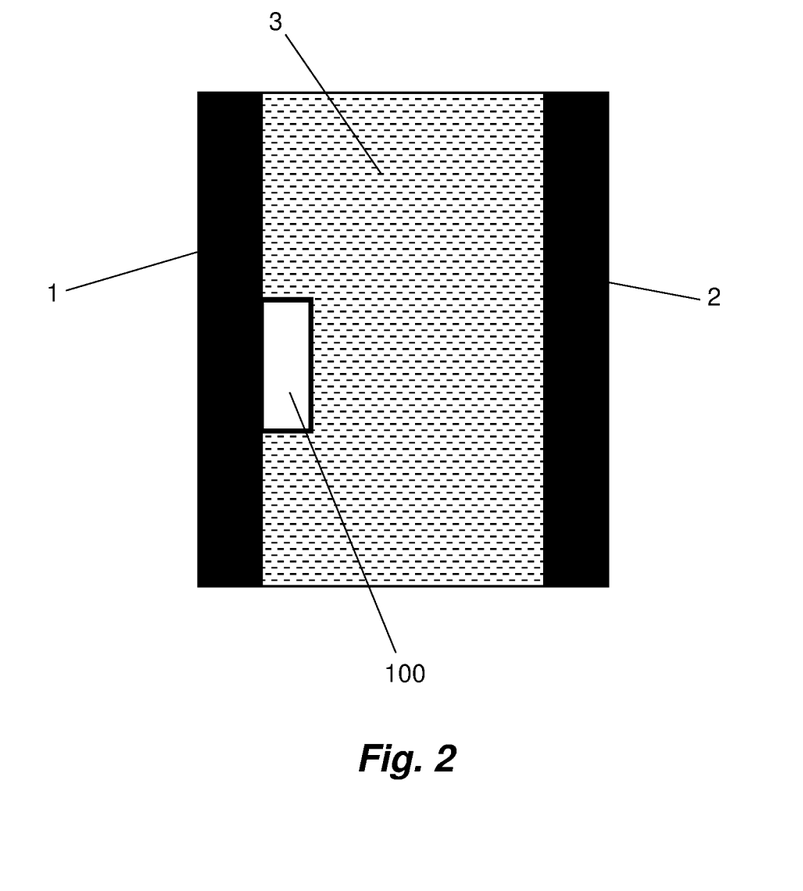
FIG. 2 shows a schematic view of the sealing device associated with a first surface of the refrigerator, according to one embodiment of the present invention.
Figure 3:
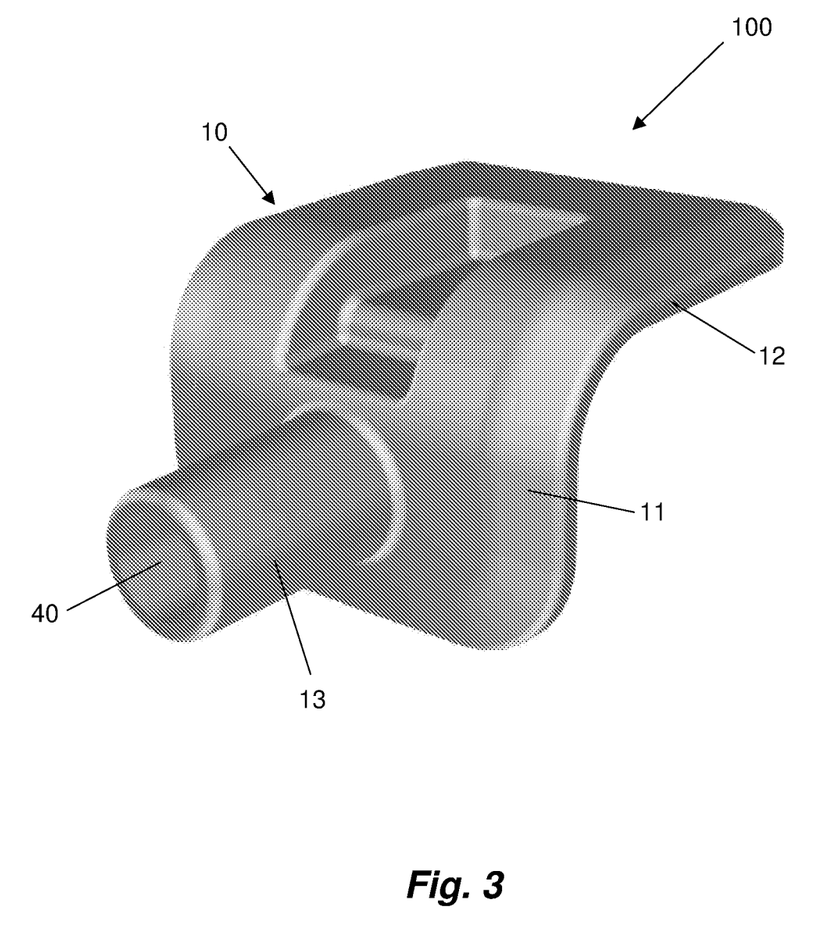
FIG. 3 shows a front perspective view of the sealing device, according to one embodiment of the present invention.

As can be seen from FIG. 2, the sealing device 100 is associated with at least one of the first and second surfaces 1, 2.

Preferably, the first and second surfaces 1, 2 are chosen from a group formed by: a surface of a fixing region 230 of an electronic board housing 200 of the refrigerator 1000, a surface of a back panel housing of the refrigerator 1000, a surface of a structural part, a surface of a counter-door, a surface of an inner box and a surface of a lining of a refrigerator 1000 door.

However, a person skilled in the art will immediately notice the versatility of the sealing device 100 and its potential application on other surfaces 1, 2 of refrigerator 1000, provided that an insulating element 3 is defined between such surfaces 1, 2.

Starting now with the description of the sealing device 100, it is noted that it comprises an external structure 10, an internal structure 20 and a connection region 30 that interconnects the external structure 10 with the internal structure 20.

At least one first fixing element 31 is arranged in the connection region 30, while a through-hole 40 is arranged between the external 10 and internal 20 structures.

In one embodiment of the present invention, the at least one first fixing element 31 protrudes radially from the connection region 30 with respect to the through-hole 40.

Preferably, the at least one first fixing element 31 forms a male-female arrangement with at least one of the first and second surfaces 1, 2.

In one embodiment of the present invention, the at least one first fixing element 31 comprises two locks diametrically opposed to each other with respect to the through-hole 40. Such an embodiment is illustrated, for example, in FIGS. 8 and 9.

Figure 8:
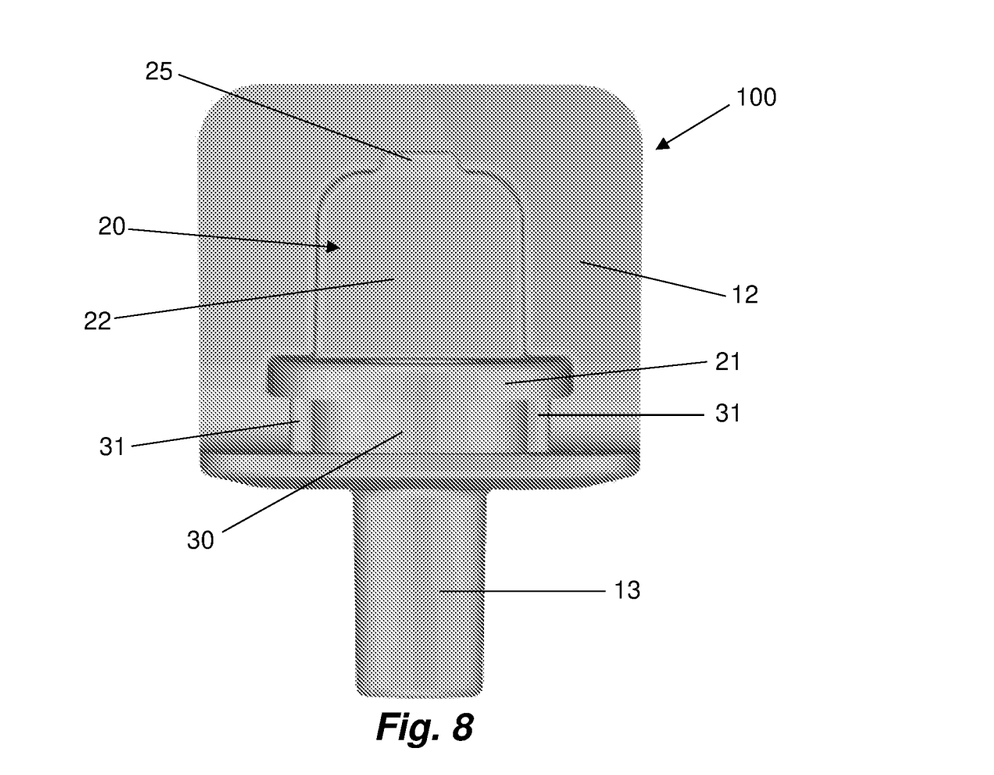
FIG. 8 shows a bottom view of the sealing device, according to one embodiment of the present invention.
Figure 9:
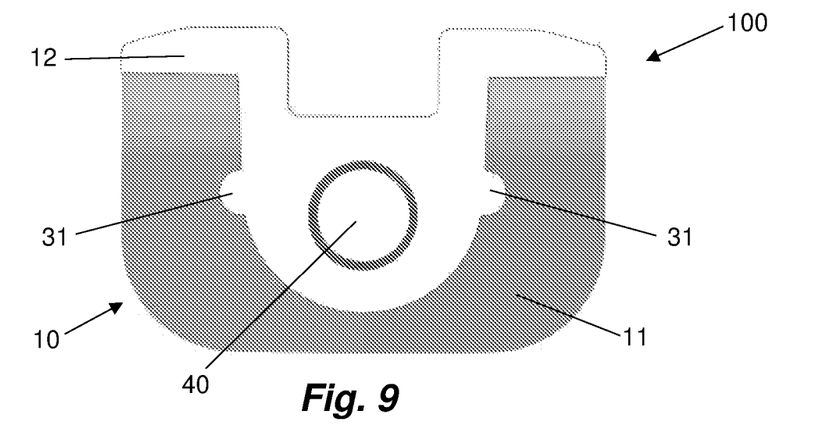
FIG. 9 shows a sectional view of the sealing device, according to one embodiment of the present invention.
Figure 10:
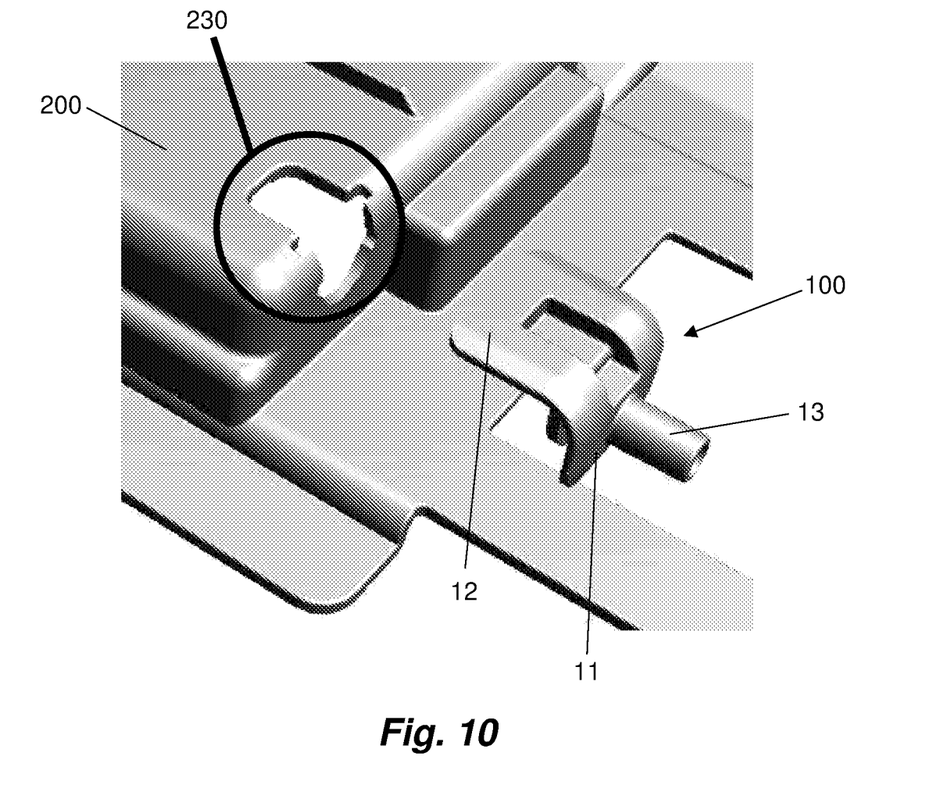
FIG. 10 shows a perspective view of the sealing device and an electronic board housing of the refrigerator, according to one embodiment of the present invention.

In the aforementioned embodiment, the diametrically opposed locks comprise semicircular protuberances projected from the connection region 30.

In another embodiment, the internal structure 20 further comprises at least one second fixing element 25, so that the at least one first and second fixing elements 25 form a male-female arrangement with at least one of the first and second surfaces 1, 2.

Figure 4:
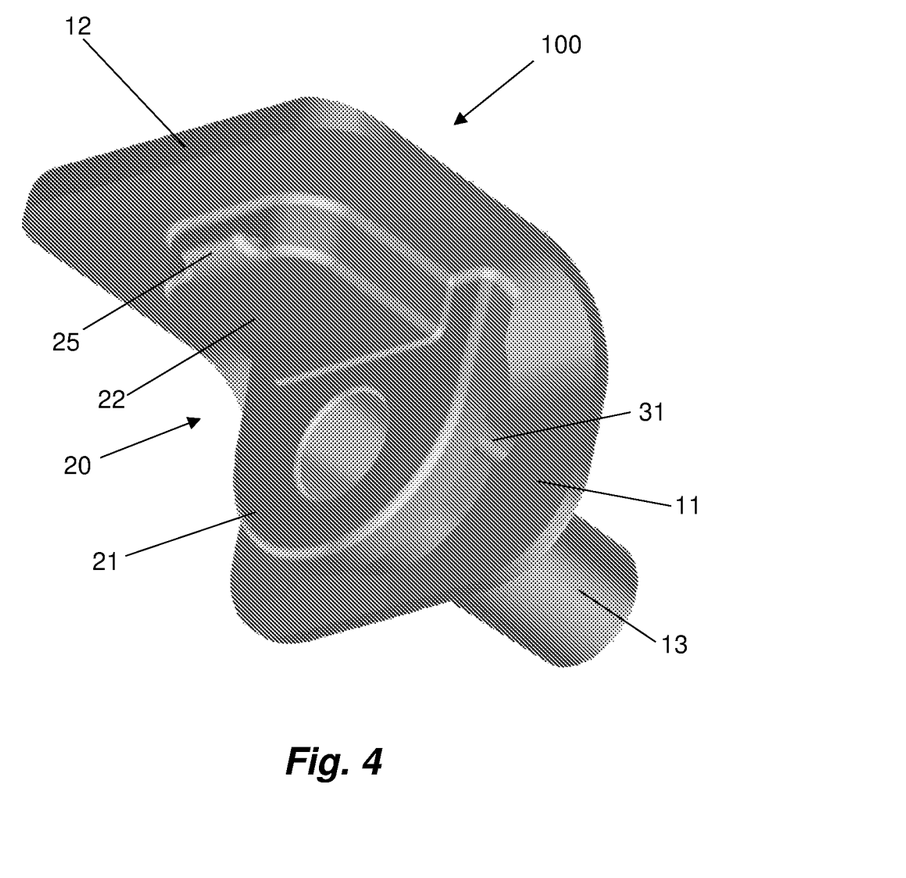
FIG. 4 shows a rear perspective view of the sealing device, according to one embodiment of the present invention.
Figure 5:
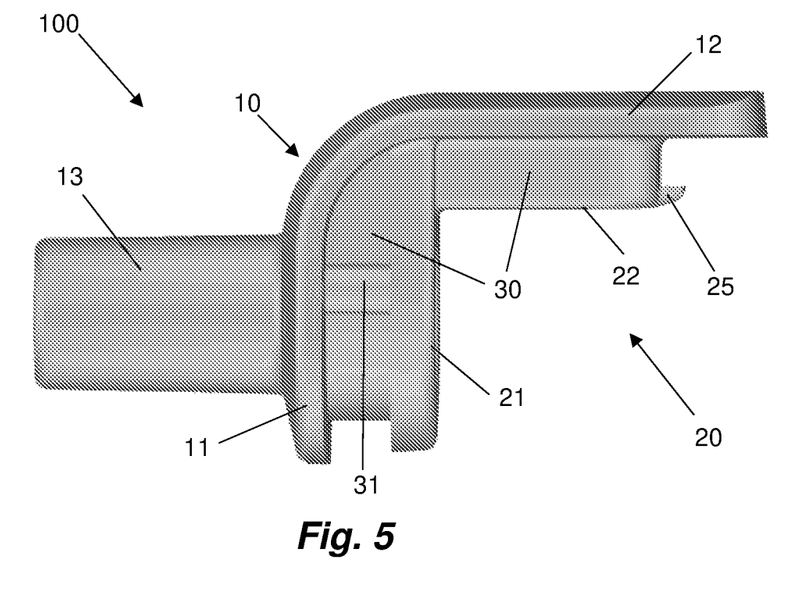
FIG. 5 shows a side view of the sealing device, according to one embodiment of the present invention.
Figure 6:
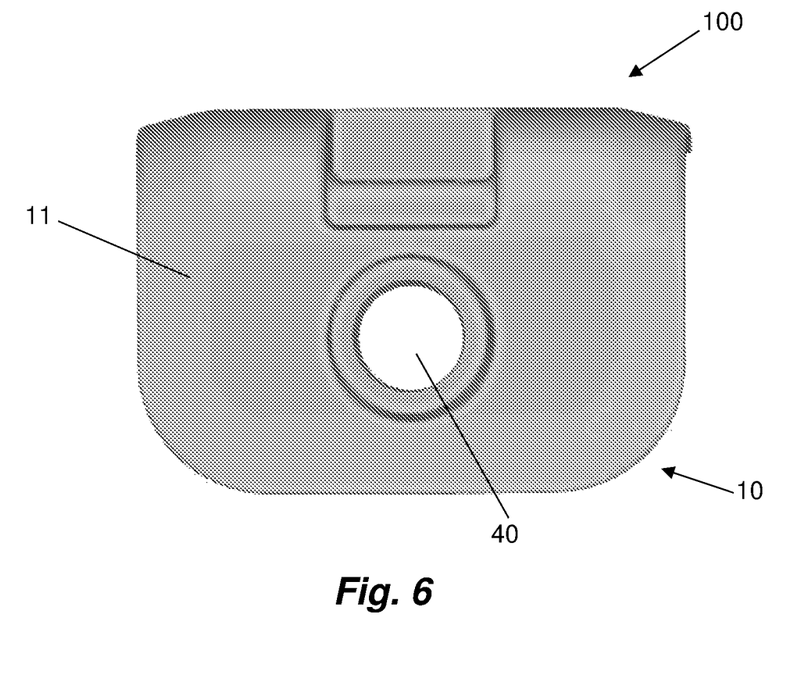
FIG. 6 shows a front view of the sealing device, according to one embodiment of the present invention.
Figure 7:
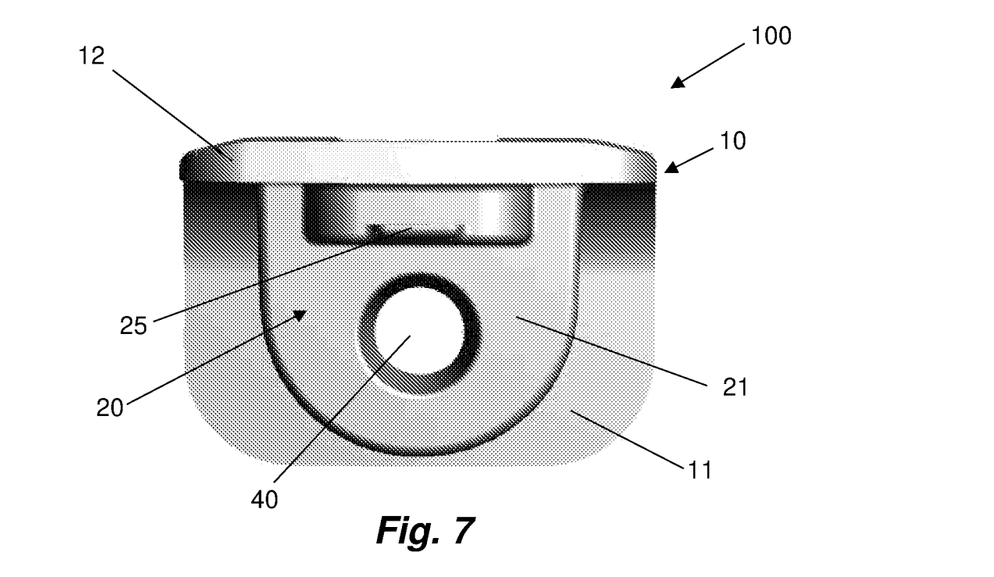
FIG. 7 shows a rear view of the sealing device, according to one embodiment of the present invention.

The second fixing element 25 can be, for example, a fitting flap or projection, as illustrated by FIGS. 4 and 5 of the present application.

In addition, the external structure 10 may comprise a first outer region 11 and a second outer region 12, perpendicular to each other.

Furthermore, the internal structure 20 may comprise a first inner region 21 and a second inner region 22, perpendicular to each other.

Thus, it is observed that the connection region 30 interconnects both the first outer region 11 with the first inner region 21 and the second outer region 12 with the second inner region 22 (see, for example, FIG. 5).

It should be noticed that, in one embodiment of the present invention, the through-hole 40 is arranged between the first inner region 21 and the first outer region 11. However, in another embodiment (not shown), the through-hole 40 can be arranged between the second inner region 22 and the second outer region 12.

Preferably, the first outer region 11 is parallel to the first inner region 21 and the second outer region 12 is parallel to the second inner region 22.

In one embodiment, the at least one first fixing element 31 is disposed between the first outer region 11 and the first inner region 21, while the at least one second fixing element 25 is a fitting flap projected from the second inner region 22.

In addition, the sealing device 100 may comprise a duct 13 projecting outwardly from the first outer region 11, wherein the through-hole 40 extends through the duct 13.

By way of example, the duct 13 can allow the passage of electrical wiring to an electronic component of the refrigerator 1000, said wiring being provided between the insulating element 3, which in turn is arranged in the space between the first 1 and the second 2 surfaces.

In one embodiment of the invention, the duct 13 of the sealing device 100 is coupled to a cable (not shown) comprising electrical wiring in an interfering manner, in order to seal any passage of PU foam through the duct 13.

The interference fit of the cable to the duct 13 is particularly advantageous since it eliminates the need for clipping or any additional sealing element, such as an adhesive tape or a gasket.

The following example describes the fitting of the sealing device 100 and an electronic board housing 200 of the refrigerator 1000, one of the possible embodiments of the present invention.

A person skilled in the art will appreciate that the following example can easily be replicated to other surfaces 1, 2 of refrigerator 1000, such as the surface of a back panel housing of the refrigerator 1000, the surface of a structural part, the surface of a counter-door, the surface of an inner box and the surface of a lining of a refrigerator 1000 door.

Referring to the electronic board housing 200 of the refrigerator 1000, it is noted that the fixing region 230 comprises a gap 231 with a shape cooperating with the first inner region 21.

Thus, the sealing device 100 is arranged in the fixing region 230 when fitting the housing 200, so that the first inner region 21 is inserted into the gap 231, the at least one first fixing element 31 is coupled to a third fixing element 210 arranged in the fixing region 230 and the at least one second fixing element 25 is coupled to a fourth fixing element 220 arranged in the fixing region 230.

Figure 11:
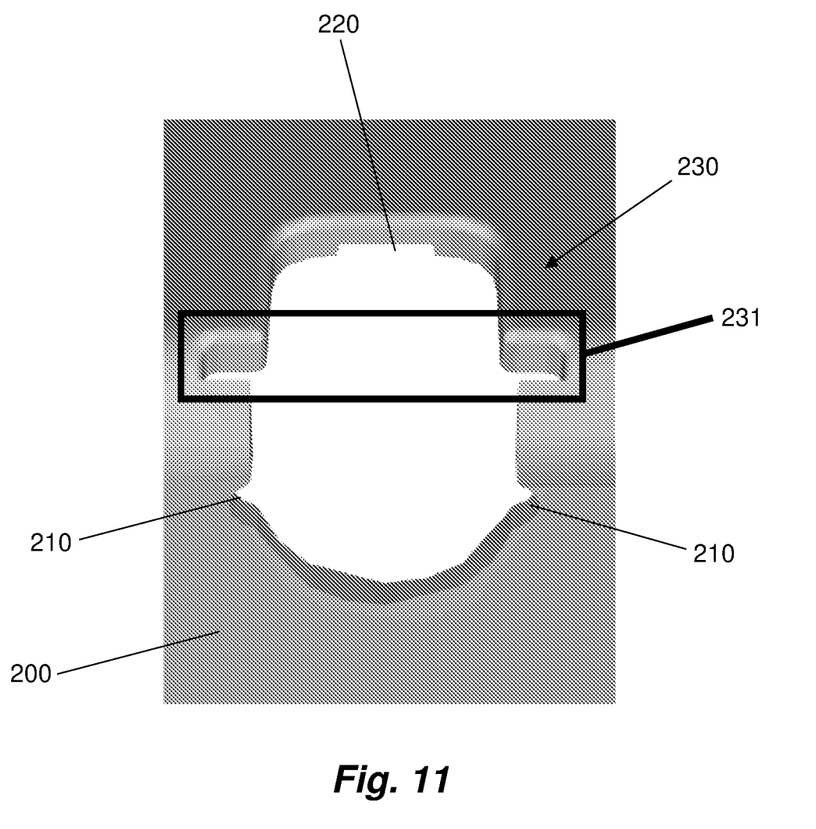
FIG. 11 shows a detail view of the attachment surface of the first surface of the refrigerator, according to one embodiment of the present invention.

The third and fourth fixing elements 210, 220 can be better seen, for example, in FIG. 11. Note that the third fixing element 210 comprises two semicircular recesses diametrically opposed to each other, with a shape corresponding to that of the at least one first fixing element 31, while the fourth fixing element 220 comprises a recess with a shape corresponding to that of the second fixing element 25.

Figure 12:
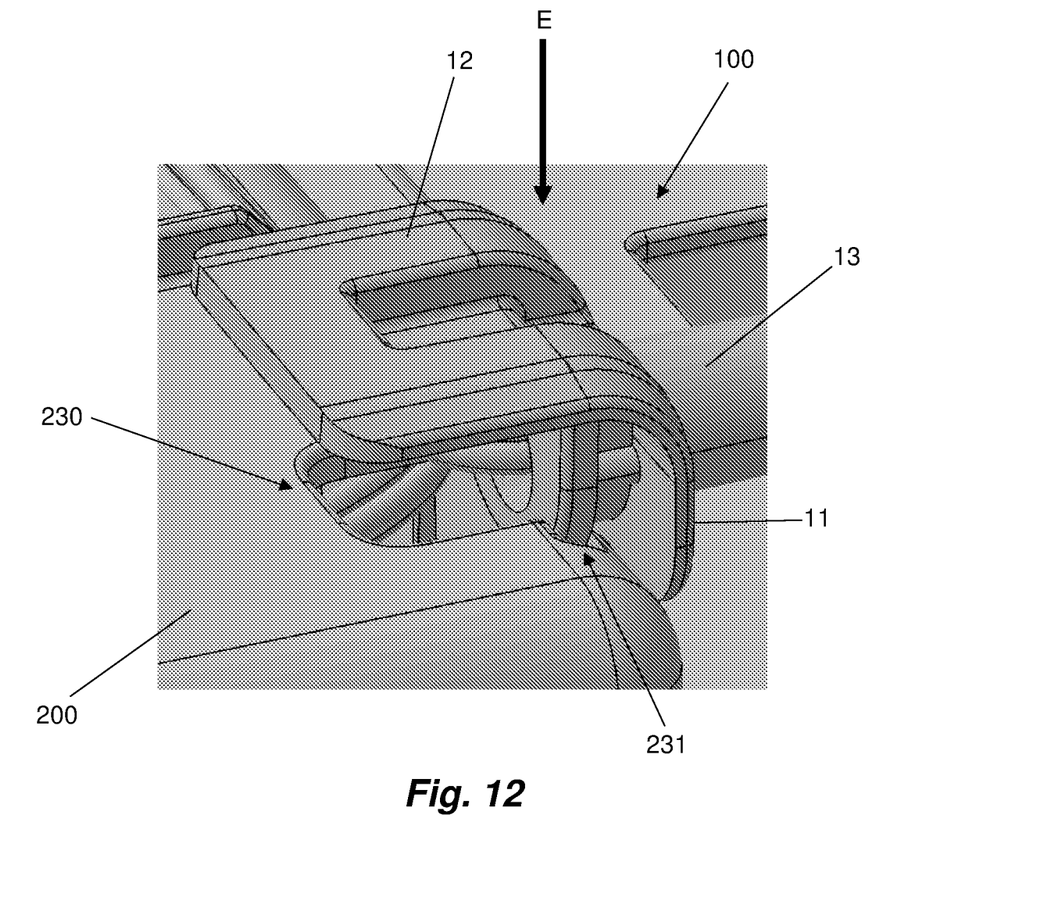
FIG. 12 shows an approximate view of the fitting between the sealing device and the housing, according to one embodiment of the present invention.

It is worth noting that the coupling of the at least one first fixing element 31 to the third fixing element 210, as well as the coupling of the second fixing element 25 to the fourth fixing element 220, block the movement of the sealing device 100 along a direction "E" (FIG. 12).

On the other hand, the insertion of the first inner region 21 to the gap 231 blocks the movement of the device 100 along a direction transversal to the direction "E".

As noticed above, the fitting between the sealing device 100 and the fixing region 230 of the electronic board housing 200 of the refrigerator 1000 can be performed from a unidirectional movement, for example, along the direction "E" shown in FIG. 12.

In order to ensure effective sealing of the electronic board with respect to the insulating element 3, the external structure 10 has an area larger than the area of the fixing region 230; see for example FIG. 12 of the present application.

The larger area of the external structure 10 in relation to the fixing region 230 allows a contact/support area to be formed between the sealing device 100 and the housing 200, which helps to prevent the passage of the insulating element 3 to areas reserved for electronic components of the refrigerator 100.

Thus, the fitting together with the contact/support of the components mentioned above allows the effective and practical sealing of electronic components, such as the electronic board, in relation to the insulating element 3.

It is worth noting that the locking (movement blocking) of the device 100 carried out in transverse directions also makes its removal difficult, since it cannot be performed by a unidirectional movement. Thus, the sealing device 100 remains fixed during the application step of the insulating element 3 and guarantees the isolation of the electronic components of the refrigerator 1000.

Advantageously, the sealing device 100 can comprise a plastic part manufactured from an injection process, in a simple and low-cost manner.

In addition, the sealing device 100 does not require the use of adhesive tapes or other additional sealing means, for example, gaskets.

In addition, the present invention discloses a sealing device 100 suitable for fitting to a refrigerator surface 1, 2 by robotic processes, in view of the simplicity of the movements required for said fitting.

Although the description of the particular embodiment above refers to a particular example, the present invention can be achieved in analogous ways, and it may present modifications in its implementation form, so that the scope of protection of the invention is limited only by the content of the appended claims, including all possible equivalent variations linked to the refrigerator 1000.

The invention claimed is:

1. A refrigerator (1000) comprising:
a first surface (1);
a second surface (2);
an insulating element (3) arranged between the first and second surfaces (1, 2); and
a sealing device (100) associated with at least one of the first and second surfaces (1, 2), wherein the sealing device (100) comprises:
an external structure (10) comprising a first outer region (11) and a second outer region (12) perpendicular to each other,
an internal structure (20) comprising a first inner region (21) and a second inner region (22) perpendicular to each other,
a connection region (30) that interconnects the external structure (10) with the internal structure (20),
at least one first fixing element (31) arranged in the connection region (30), and
a through-hole (40) between the external (10) and internal (20) structures, wherein the through-hole (40) is exposed on external and internal sides of the sealing device (100), such that the through-hole (40) is accessible on the external and internal sides;
wherein the at least one first fixing element (31) forms a male-female arrangement with at least one of the first and second surfaces (1, 2).

2. The refrigerator (1000) according to claim 1, wherein the at least one first fixing element (31) protrudes radially from the connection region (30) in relation to the through-hole (40).

3. The refrigerator (1000) according to claim 1, wherein the internal structure (20) of the sealing device (100) further comprises at least one second fixing element (25); wherein the at least one first and second fixing elements (25) form a male-female arrangement with at least one of the first and second surfaces (1, 2).

4. The refrigerator (1000) according to claim 1, wherein the first and second surfaces (1, 2) of the refrigerator (1000) are chosen from a group formed by: a surface of a fixing region (230) of an electronic board housing (200) of the refrigerator (1000), a surface of a back panel housing of the refrigerator (1000), a surface of a structural part, a surface of a counter-door, a surface of an inner box and a surface of a lining of a refrigerator (1000) door.

5. The refrigerator (1000) according to claim 1, wherein the first outer region (11) is parallel to the first inner region (21) and the second outer region (12) is parallel to the second inner region (22).

6. The refrigerator (1000) according to claim 1, wherein the at least one first fixing element (31) is arranged between the first outer region (11) and the first inner region (21).

7. The refrigerator (1000) according to claim 1, wherein the sealing device (100) comprises at least one second fixing element (25), wherein the at least one second fixing element (25) is a fitting flap projected from the second inner region (22).

8. The refrigerator (1000) according to claim 1, wherein the sealing device (100) comprises a duct (13) projecting outwardly from the first outer region (11); wherein the through-hole (40) extends through the duct (13).

9. The refrigerator (1000) according to claim 7, wherein:
one of the first and second surfaces (1, 2) is a surface of a fixing region (230) of an electronic board housing (200) of the refrigerator (1000), the fixing region (230) comprising a gap (231) with a shape cooperating with the first inner region (21); and
the sealing device (100) is arranged in the fixing region (230) so that the first inner region (21) is inserted into the gap (231), the first fixing element (31) is coupled to a third fixing element (210) arranged in the fixing region (230) and the second fixing element (25) is coupled to a fourth fixing element (220) arranged in the fixing region (230).

10. The refrigerator (1000) according to claim 4, wherein:
one of the first and second surfaces (1, 2) is the surface of the fixing region (230) of the electronic board housing (200); and
the external structure (10) of the sealing device (100) has an area larger than the area of the fixing region (230).

11. The refrigerator (1000) according to claim 1, wherein the at least one first fixing element (31) comprises two locks diametrically opposed to each other with respect to the through-hole (40).

12. A sealing device (100) comprising:
an external structure (10) comprising a first outer region (11) and a second outer region (12) perpendicular to each other;
an internal structure (20) comprising a first inner region (21) and a second inner region (22) perpendicular to each other;
a connection region (30) that interconnects the external structure (10) with the internal structure (20);
at least one first fixing element (31) arranged in the connection region (30); and
a through-hole (40) between the external (10) and internal (20) structures, wherein the through-hole (40) is exposed on external and internal sides of the sealing device (100), such that the through-hole (40) is accessible on the external and internal sides;
wherein the at least one first fixing element (31) forms a male-female arrangement with at least one of first and second surfaces (1, 2) of a refrigerator; and
wherein an insulating element (3) is arranged between the first and second surfaces (1, 2).

13. The sealing device (100) according to claim 12, wherein the first outer region (11) is parallel to the first inner region (21) and the second outer region (12) is parallel to the second inner region (22).

\* \* \* \* \*